United States Patent
Qiu et al.

(10) Patent No.: US 7,667,440 B2
(45) Date of Patent: Feb. 23, 2010

(54) POWER-SUPPLY CONTROL

(75) Inventors: Weihong Qiu, San Jose, CA (US);
Shangyang Xiao, Sunnyvale, CA (US);
Jun Liu, San Jose, CA (US)

(73) Assignee: Intersil Americas Inc., Milpitas, CA (US)

( * ) Notice: Subject to any disclaimer, the term of this patent is extended or adjusted under 35 U.S.C. 154(b) by 208 days.

(21) Appl. No.: 12/006,726

(22) Filed: Jan. 4, 2008

(65) Prior Publication Data
US 2008/0180077 A1    Jul. 31, 2008

Related U.S. Application Data

(60) Provisional application No. 60/878,921, filed on Jan. 5, 2007.

(51) Int. Cl.
*G05F 1/253* (2006.01)
(52) U.S. Cl. .................................... 323/262
(58) Field of Classification Search .............. 323/262, 323/259, 272, 266
See application file for complete search history.

(56) References Cited

U.S. PATENT DOCUMENTS

| | | | |
|---|---|---|---|
| 6,023,154 A | 2/2000 | Martinez | |
| 6,362,986 B1 | 3/2002 | Schultz et al. | |
| 6,545,450 B1 | 4/2003 | Ledenev et al. | |
| 6,696,823 B2 | 2/2004 | Ledenev et al. | |
| 6,897,641 B1 | 5/2005 | Herbert | |
| 7,233,132 B1 | 6/2007 | Dong et al. | |
| 7,276,884 B2 * | 10/2007 | Tsuruya | 323/261 |
| 7,443,146 B2 | 10/2008 | Wei et al. | |
| 7,495,421 B2 | 2/2009 | Weng et al. | |
| 7,498,782 B2 | 3/2009 | Nguyen et al. | |
| 2003/0173941 A1 | 9/2003 | Harris et al. | |
| 2007/0279022 A1 | 12/2007 | Chen et al. | |
| 2009/0085536 A1 | 4/2009 | Qahouq et al. | |

* cited by examiner

*Primary Examiner*—Shawn Riley
(74) *Attorney, Agent, or Firm*—Paul A. Bernkopf; Graybeal Jackson LLP

(57) ABSTRACT

An embodiment of a power-supply controller is operable to couple a first node of a first inductor to first and second reference nodes, the first inductor composing a first phase of a power supply and having a second node coupled to an output node of the power supply. The controller is also operable to couple a first node of a second inductor to third and fourth reference nodes, the second inductor composing a second phase of the power supply and having a second node. Furthermore, the controller is operable to uncouple the second node of the second inductor from the output node of the power supply. For example, where the first and second inductors are magnetically coupled, such a controller allows the power supply to operate as an uncoupled-inductor (UI) power supply in one mode, and as a coupled-inductor (CI) power supply in another mode.

25 Claims, 16 Drawing Sheets

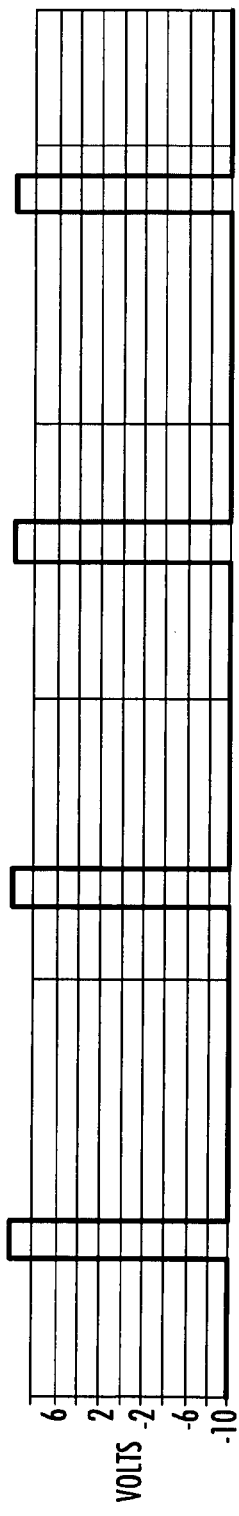
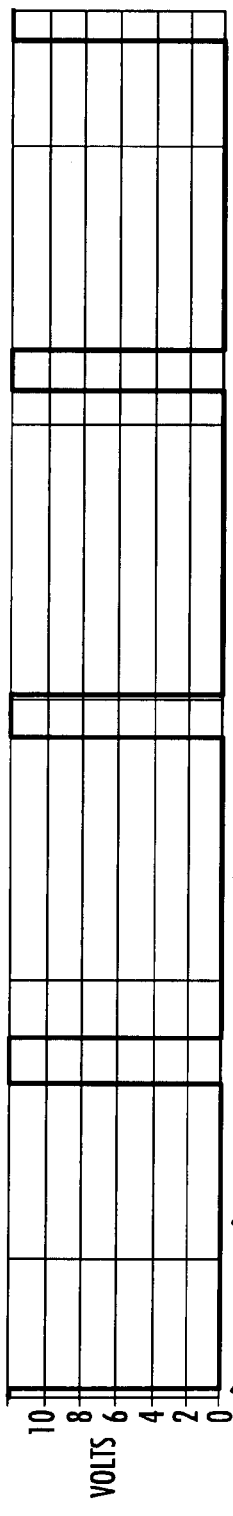
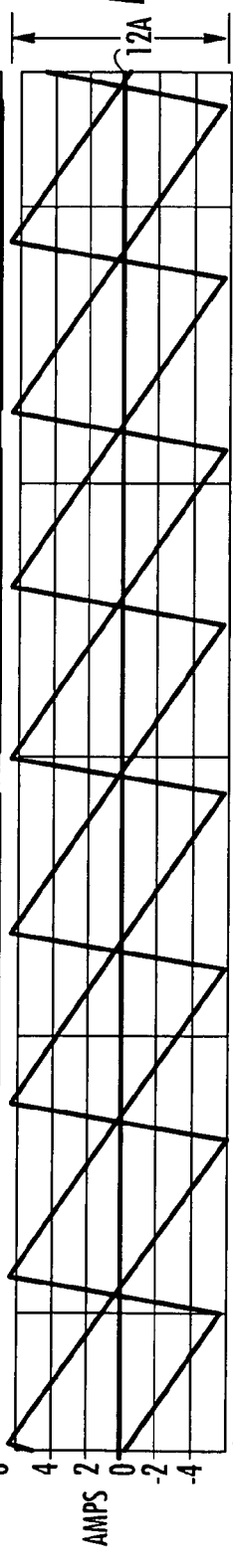
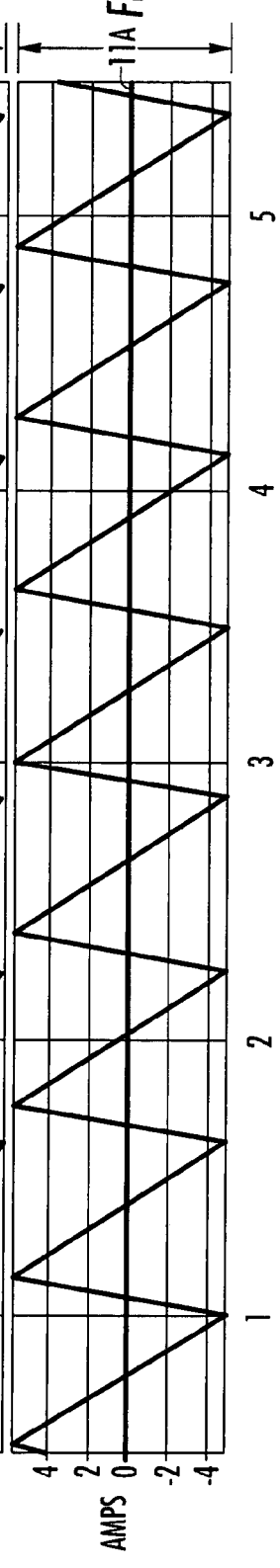
FIG. 6A
FIG. 6B
FIG. 6C
FIG. 6D

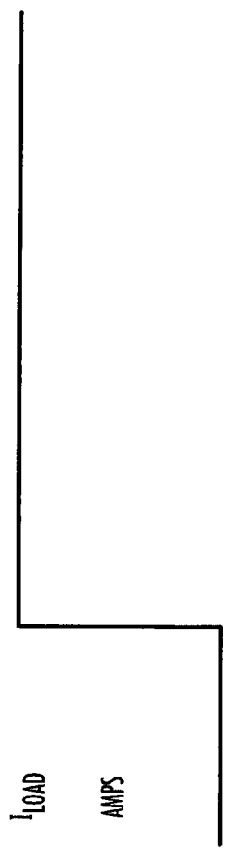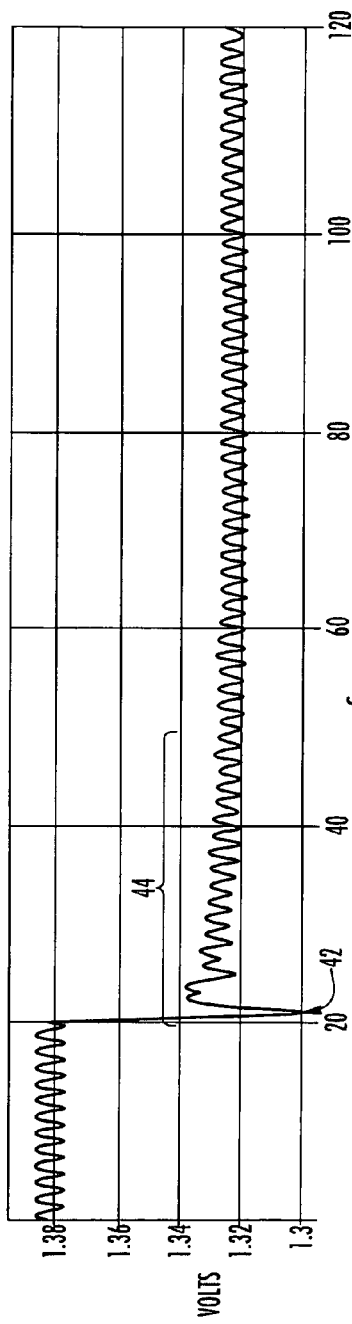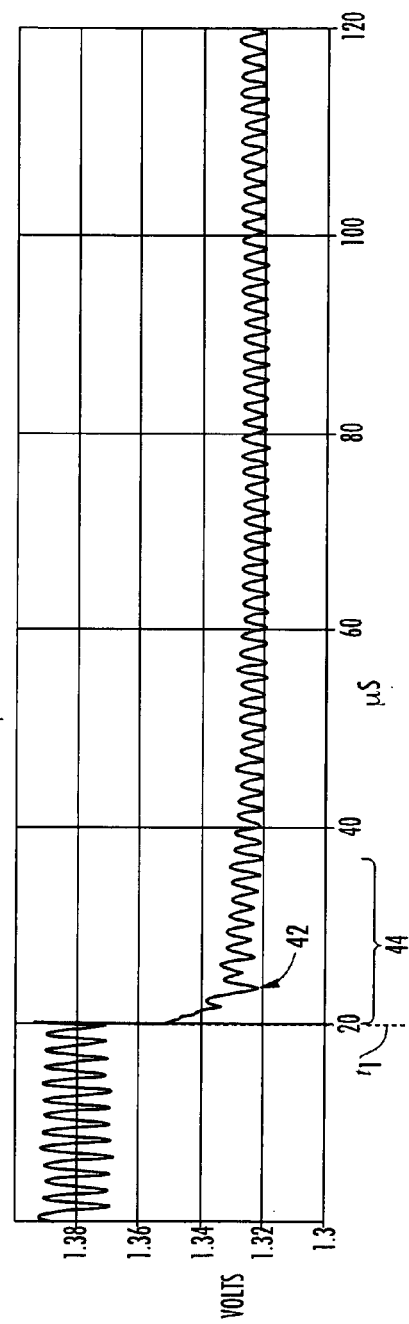
FIG. 8A
FIG. 8B
FIG. 8C

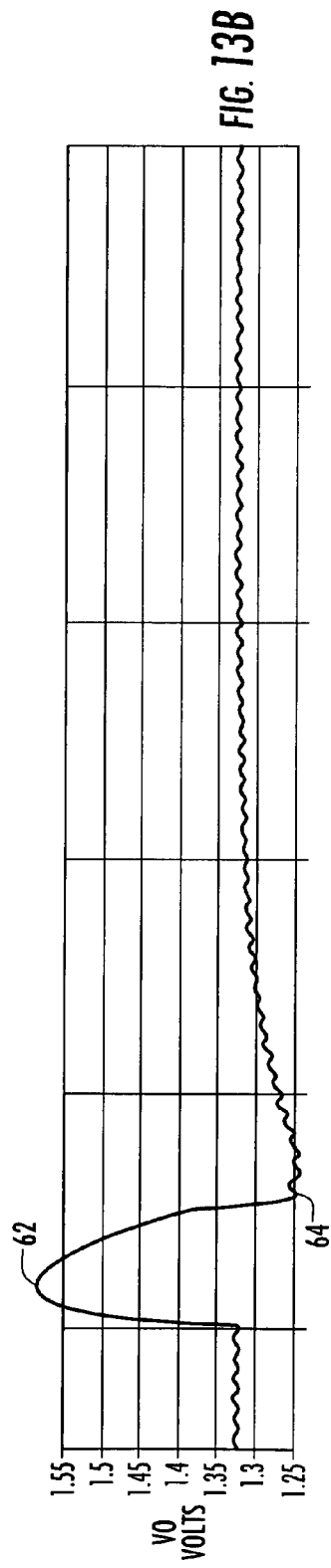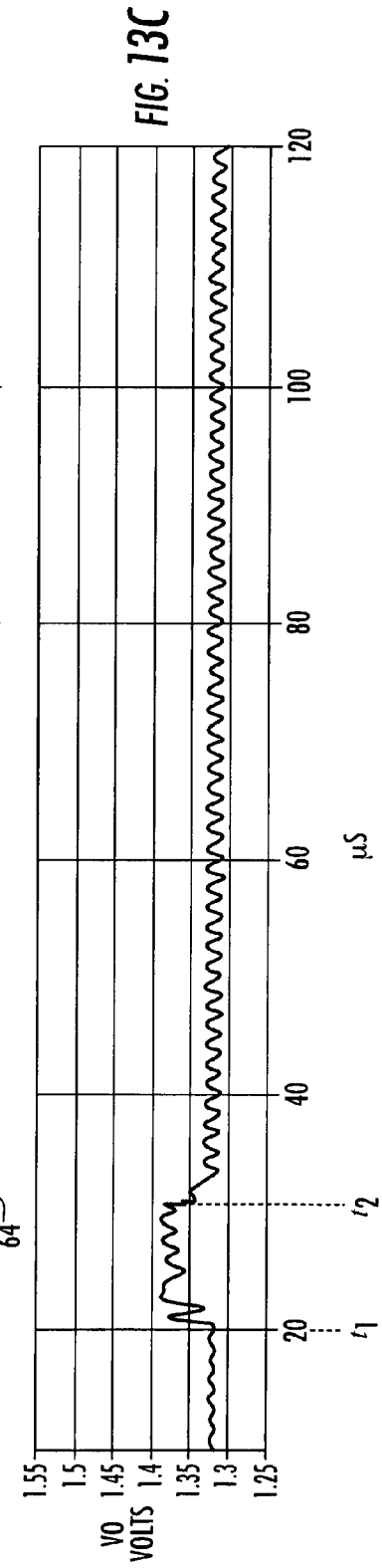
FIG. 13A
FIG. 13B
FIG. 13C

POWER-SUPPLY CONTROL

CLAIM OF PRIORITY

This application claims priority to U.S. Provisional Application Ser. No. 60/878, 921 which was filed on Jan. 05, 2007, and which is incorporated by reference.

CROSS-RELATED APPLICATIONS

This application is related to U.S. patent application Ser. No. 12/006,703, which is commonly owned with and was filed on the same day as the present application, and which is incorporated by reference.

BACKGROUND

Multiphase switching power supplies are used in many applications. For example, a multiphase buck converter may be used to generate a regulated output voltage (e.g., 1.8 V) from an input voltage (e.g., 3.3 V) having a magnitude that is greater than the magnitude of the output voltage.

An uncoupled-inductor (UI) power supply is a type of multiphase supply that typically has one filter inductor per phase, where the filter inductor of each phase is magnetically uncoupled from the filter inductors of the other phases.

For a specified output ripple voltage and transient response, a UI power supply has a relatively high efficiency, but also has a relatively large filter capacitance. The output ripple voltage is the voltage ripple that is superimposed on the regulated output voltage, and typically has a magnitude in the range of a few millivolts. The transient response is a measure of how fast the power supply stabilizes the regulated output voltage in response to a change in the load current. And the efficiency is a measure of the power consumed and dissipated as heat by the power supply itself; the higher the efficiency, the less power the supply consumes, and vice-versa. In a multiphase switching power supply, it is the power supply's switching circuitry that typically consumes most of the power consumed by the supply. Furthermore, the larger the filter capacitance, typically the larger and more expensive the power supply.

A coupled-inductor (CI) power supply is a type of multiphase supply that typically has one inductor per phase, where the inductor of one phase is magnetically coupled to the inductor(s) of at least one of the other phases.

Compared to a UI power supply for a specified given output ripple voltage and transient response, a CI power supply typically has a lower efficiency but a smaller filter capacitance.

Consequently, a designer may have no choice but to select a UI power supply for a system, such as a battery-powered system (e.g., a laptop computer), where, to extend the battery life and/or to minimize the system's heat generator, the efficiency of the supply is more important than the size and cost of the supply.

Conversely, a designer may have no choice but to select a CI power supply for a system, such as hand-held system (e.g., a cell phone or MP3 player), where, to fit the system within a relatively small housing and within a desired price range, the size and cost of the supply are more important than the efficiency of the supply.

SUMMARY

An embodiment of a power-supply controller is operable to couple a first node of a first inductor to first and second reference nodes, the first inductor composing a first phase of a power supply and having a second node coupled to an output node of the power supply. The controller is also operable to couple a first node of a second inductor to third and fourth reference nodes, the second inductor composing a second phase of the power supply and having a second node. Furthermore, the controller is operable to uncouple the second node of the second inductor from the output node of the power supply.

For example, where the first and second inductors are magnetically coupled, such a controller allows the power supply to operate as a UI supply in one mode, and as a CI supply in another mode. For example, the controller may operate the power supply as a UI supply during a steady-state load condition so that the supply operates with better efficiency than a CI supply would for the specified output ripple voltage. And the controller may operate the power supply as a CI supply during a load insertion transient (i.e., a step increase in the load current) so that the supply operates with a better transient response than a UI supply would for the supply's filter capacitance.

Consequently, a designer may use such a controller to design a power supply that has at least one feature of a UI supply and at least one feature of a CI supply.

Furthermore, the controller may allow a power supply to have one or more features that are unavailable in conventional UI and CI power supplies.

BRIEF DESCRIPTION OF THE DRAWINGS

FIGS. 6A-6D are plots of signals generated by the power supply of FIG. 1 during the second operational mode.

FIGS. 8A-8C are plots of the load current experiencing a load-insertion transient, the output-voltage-insertion-transient response of the power supply of FIG. 1 during the second operational mode of FIG. 5, and the output-voltage-insertion-transient response of the supply of FIG. 1 during the third operational mode of FIG. 7.

FIGS. 13A-13C are plots of the load current experiencing a load-release transient followed by a load-insertion transient, the output-voltage-transient response of the power supply of FIG. 1 during the second operational mode of FIG. 5, and the output-voltage-transient response of the supply of FIG. 11 as it sequences from the second operating mode through the fourth, fifth, second, third, and fifth operating modes and back to second operating modes

DETAILED DESCRIPTION

Figure 1:
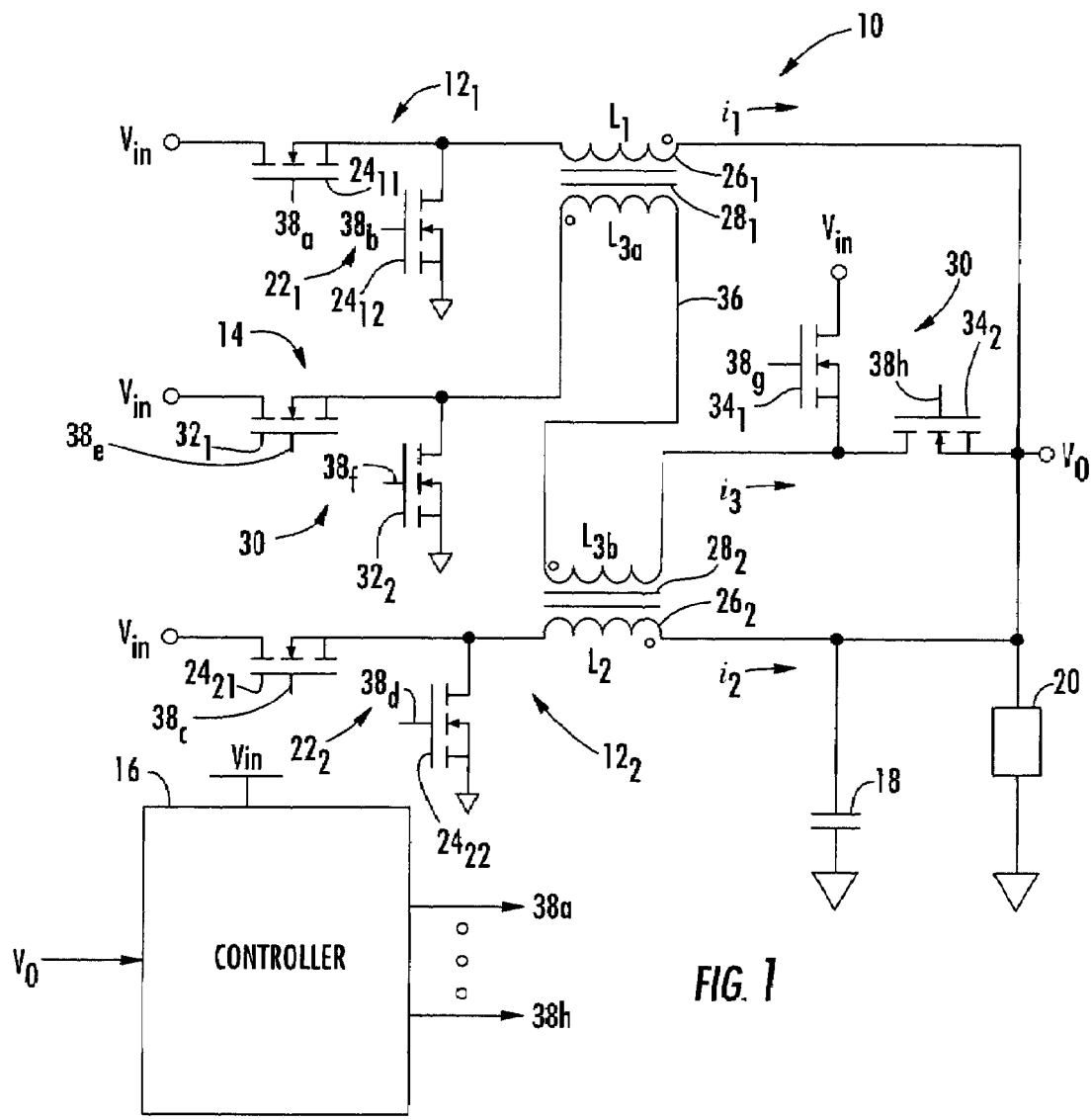
FIG. 1 is a schematic diagram of an embodiment of a power supply having a configurable supply phase.

FIG. 1 is a schematic diagram of an embodiment of a power supply 10 and a load 20. The supply 10 includes non-configurable, i.e., fixed, power-supply phases $12_1$ and $12_2$, a configurable power-supply phase 14, a power-supply controller 16, and an output filter capacitor 18. The supply 10 generates a regulated output voltage $V_o$ from an input voltage $V_{in}$, and provides Vo to the dynamic load 20. As discussed below, by adjusting the configuration of the phase 14, the controller 16 may operate the supply 10 in multiple modes. For example, the controller 16 may operate the supply 10 as a UI supply during steady-state load conditions for increased efficiency as compared to a CI supply for a specified output ripple voltage on $V_o$. Furthermore, the controller 16 may operate the supply 10 as a CI supply in response to a load-insertion transient for a better output-voltage transient response as compared to a UI supply for a special filter capacitor 18. The controller 16 may also operate the supply 10 in other modes. For example, the controller 16 may operate the supply 10 in an energy-recovery mode for an improved response to a load-release transient. And although described as being a multi-phase buck converter where $V_{in} > V_o$, the supply 10 may be any other type of switching power supply.

The fixed power-supply phase $12_1$ includes a switching circuit $22_1$ and an inductor $L_1$. The switching circuit $22_1$ includes high-side and low-side N-channel MOS power transistors $24_{11}$ and $24_{12}$, which the controller 16 may drive in phase opposition such that when the transistor $24_{11}$ is conducting, i.e., "on", the transistor $24_{12}$ is non-conducting, i.e., "off". Because the transistors $24_{11}$ and $24_{12}$ form a half-bridge driver, one may also call the fixed supply phase 12 a half-bridge phase. The inductor $L_1$ includes a winding (e.g., a copper wire) $26_1$, which is wound about a magnetically permeable core $28_1$. As is known, one may model the inductor $L_1$ as including a magnetizing inductance $L_M$, a leakage inductance $L_l$, and a winding resistance $R_{DC}$ in electrical series. But for clarity, these model components are omitted from FIG. 1.

The fixed power-supply phase $12_2$ includes a switching circuit $22_2$ and an inductor $L_2$. The switching circuit $22_2$ is similar to the switching circuit $22_1$, and the inductor $L_2$ includes a winding $26_2$ that is wound about a magnetically permeable core $28_2$.

The configurable power-supply phase 14 includes a switching circuit 30 and two serially coupled inductors $L_{3a}$ and $L_{3b}$, where $L_{3a}$ may be, but need not be, equal to $L_{3b}$.

The switching circuit 30 includes high-side and low-side N-channel MOS power transistors $32_1$ and $32_2$, which are coupled to an input node of the inductor $L_{3a}$, and also includes N-channel MOS power transistors $34_1$ and $34_2$, which are coupled to an output node of the inductor $L_{3b}$. Because the transistors $32_1$, $32_2$, $34_1$, and $34_2$ form a pseudo full-bridge driver—the transistor $34_2$ would be coupled to ground, not $V_o$, in a true full-bridge driver—one may also call the configurable supply phase $12_1$ a full-bridge phase. As discussed below in conjunction with FIGS. 3-13C, by setting the conduction states of the transistors $32_1$, $32_2$, $34_1$, and $34_2$ in respective configurations, the controller 16 may set the mode in which the supply 10 operates.

The inductors $L_{3a}$ and $L_{3b}$ include a winding 36 that is partially wound about each of the cores $28_1$ and $28_2$ such that a current $i_1$ or $i_2$ flowing through fixed phase $12_1$ or fixed phase $12_2$ tends to induce magnetically in the configurable phase 14 a current $i_3$ when the transistors $32_2$ and $34_2$ are on and the transistors $32_1$ and $34_1$ are off. In an embodiment, $L_1 = L_2 = L_{3a} + L_{3b}$, and $L_{3a} = L_{3b}$.

Figure 2:
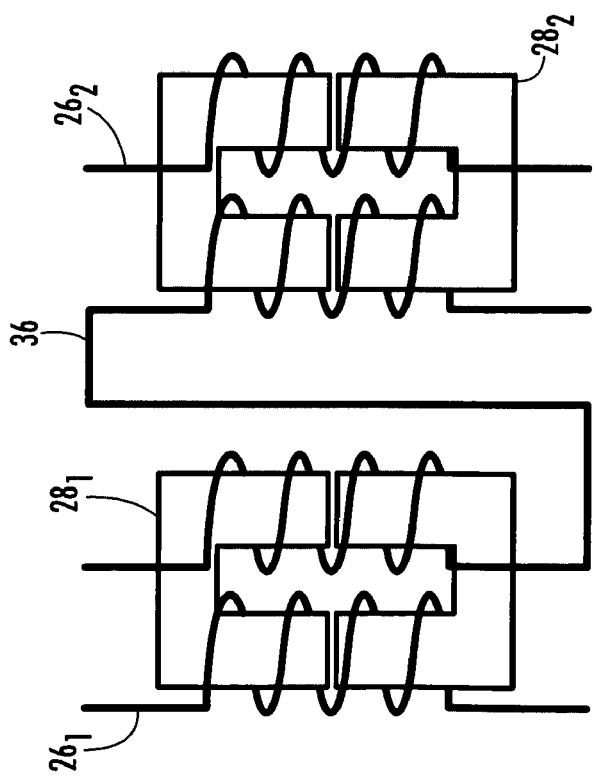
FIG. 2 is a diagram of an embodiment of the magnetic cores and the phase windings for the power supply of FIG. 1.

FIG. 2 is a diagram of an embodiment of the windings $26_1$ and $26_2$, the cores $28_1$ and $28_2$, and the winding 36 of FIG. 1. Although shown as including an air gap in each rung, the cores $28_1$ and $28_2$ may each omit the air gap in one or both of the rungs. Furthermore, although shown as each having the same width, the gaps may have different widths. Moreover, the cores $28_1$ and $28_2$ may be made from any suitable core magnetically permeable material. Alternatively, one or both of the cores $28_1$ and $28_2$ may be made from a suitable non-magnetically permeable material. Or, the transformer formed by the windings $26_1$ and $26_2$ may be coreless. For example, the windings $26_1$ and $26_2$ may be effectively wrapped around an air core or the equivalent thereof.

Referring again to FIG. 1, the controller 16 of the power supply 10 receives $V_{in}$ and $V_o$, and includes drive nodes 38a-38h, which are respectively coupled to the gates of the transistors $24_{11}$, $24_{12}$, $24_{21}$, $24_{22}$, $32_1$, $32_2$, $34_1$, and $34_2$ so that the controller may turn these transistors on and off. The controller 16 may also receive and generate additional signals that are omitted from FIG. 1. Furthermore, the controller 16 may switch the supply 10 according to any conventional technique such as a pulse-width-modulation (PWM) technique or a constant-on-time technique. Moreover, the controller 16 may be the same as or similar to a power-supply controller described in U.S. 2003/0173941, which is incorporated by reference.

The output filter capacitor 18 low-pass filters $V_o$, and may include an equivalent series resistance (ESR) that may give rise to at least a portion of the voltage ripple superimposed on $V_o$. Although only one filter capacitor 18 is shown, the supply 10 may include multiple filter capacitors coupled together in electrical parallel. Furthermore, one or more LC filters may be disposed between the capacitor 18 and the load 20 to further reduce the voltage ripple.

The load 20, which is powered by, but which is not part of, the power supply 10, may, within a relatively short time period, significantly change the amount of current that it draws from the supply 10. For example, the load 20 may be a processor having a sleep mode. When the processor "goes to sleep", it may reduce the current it draws from the supply 10 by hundreds of milliamps within a few microseconds, and thus may give rise to a load-release transient. Conversely, when the processor "wakes up", it may significantly increase the current it draws from the supply 10 by hundreds of milliamps within a few microseconds, and thus may give rise to a load-insertion transient.

Still referring to FIG. 1, alternative embodiments of the power supply 10 are contemplated. For example, the supply 10 may be replaced by its electrical dual, where $V_{in}$ and $V_o$ are negative relative to ground, and the N-channel transistors 24, 32, and 34 are replaced with respective P-channel transistors. Alternately, the N-channel transistors 24, 32, and 34 may be replaced with respective insulated-gate bipolar transistors (IGBTs), bipolar transistors (BJTs), or other suitable devices.

Figure 3:
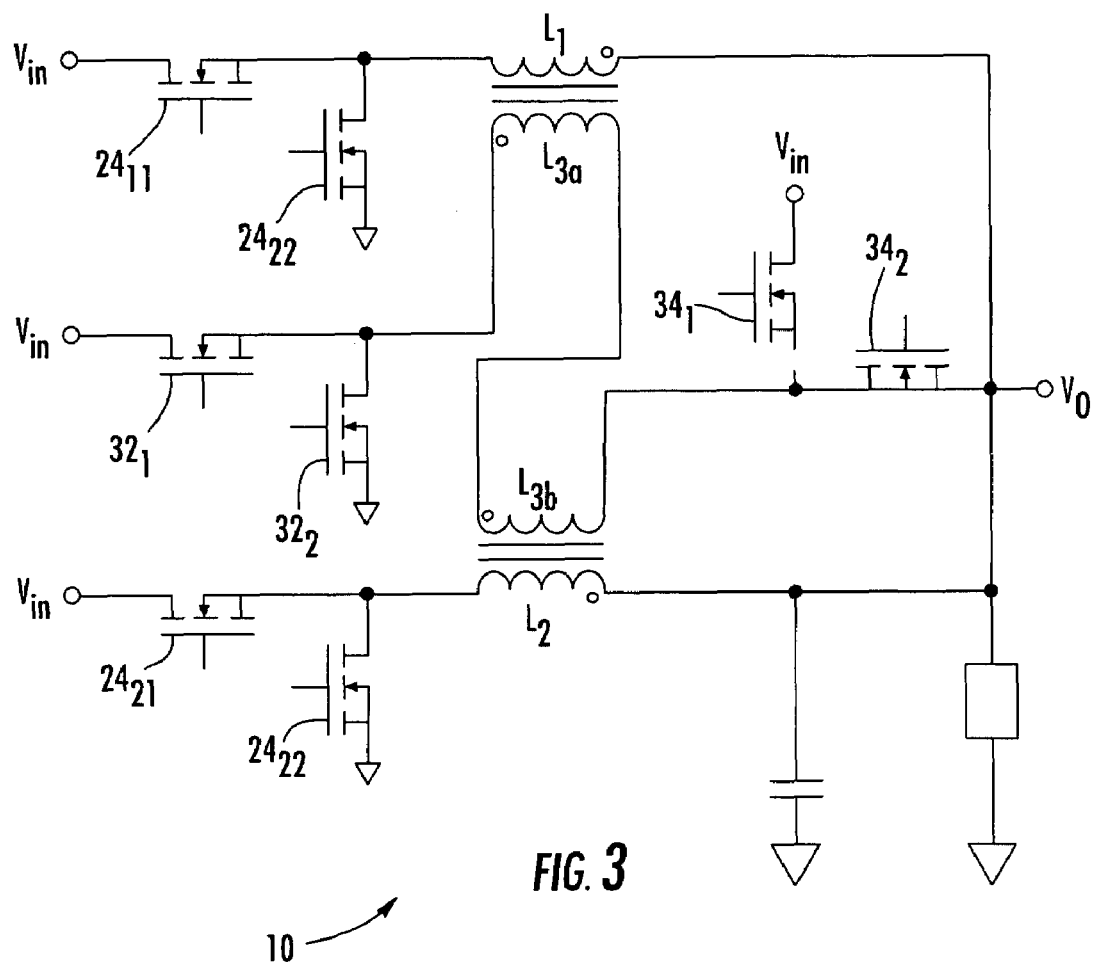
FIG. 3 is a schematic diagram of the configuration of the power supply of FIG. 1 during a first operational mode in which the supply operates as a three-phase CI supply.

FIG. 3 is a schematic diagram that shows the configuration of the power supply 10 of FIG. 1 during an embodiment of a first operating mode in which the power supply operates as a three-phase CI supply. Like numbers reference components common to FIGS. 1 and 3, although for clarity, the controller 16 and some of the reference numbers are omitted from FIG. 3.

In the first operating mode, the controller 16 (FIG. 1) turns the transistor $34_1$ off and turns the transistor $34_2$ on, and maintains these transistors in these respective states for the duration of the first operating mode. To represent this schematically, the transistor $34_1$ is shown as being disconnected from the output node of the inductor $L_{3b}$ to indicate that this transistor is electrically open and is thus off, and the source and drain of the transistor $34_2$ are shown connected together to indicate that this transistor is electrically closed and is thus on. Consequently, the inductors $L_1$ and $L_2$ are magnetically coupled to $L_{3a}$ and $L_{3b}$, respectively, with the cores $28_1$ and $28_2$ and are also coupled to one another via the inductors $L_{3a}$ and $L_{3b}$.

FIGS. 4A-4E are plots of signals generated by an embodiment of the power supply of FIG. 1 during the first operational mode under a steady-state load condition—a steady-state load condition exists when the current drawn by the load 20, i.e., the load current, is substantially constant. Some of these signals may be capacitively coupled to the simulated probe, hence the excursion above and below zero.

FIG. 4A is a plot of the voltage with which the controller 16 (FIG. 1) drives the gate of the transistor $24_{11}$. The voltages with which the controller 16 drives the transistors $24_{21}$ and $32_1$ may each have a similar amplitude profile, but may be offset in phase from the voltage at the gate of the transistor $24_{11}$ by, for example, approximately +120° and approximately −120°, respectively. The voltages with which the controller 16 drives the gates of the transistors $24_{12}$, $24_{22}$, and $32_2$ are the complements of the respective voltages with which the controller drives the gates of the transistors $24_{11}$, $24_{12}$, and $32_1$, with an optional guard delay to prevent the push-pull coupled pairs of these transistors (e.g., transistors $24_{11}$ and $24_{12}$) from conducting a "crowbar" current. That is, there may be a delay between the time that the drive voltage for the transistor $24_{11}$ goes low and the time that the drive voltage for the transistor $24_{12}$ goes high to prevent the transistors $24_{11}$ and $24_{12}$ from simultaneously being on and conducting a current directly between $V_{in}$ and ground. Preventing simultaneous conduction of both transistors of a push-pull coupled pair of transistors is often called "shoot-through protection."

FIG. 4B is a plot of the voltage across the inductor $L_1$, this voltage being caused by the leakage-inductance portion of $L_1$. The voltages across the inductor $L_2$ and the series combination of $L_{3a}$ and $L_{3b}$ may each have a similar amplitude profile, but may be offset in phase from the voltage across $L_1$ by, for example, approximately +120° and approximately −120°, respectively.

FIG. 4C is a plot of the current through the fixed phase $12_1$, the current through the fixed phase $12_2$ having a similar amplitude profile but being offset in phase (e.g., approximately +/−120°) from the current through the phase $12_1$. In an embodiment, the peak-to-peak current through each phase $12_1$ and $12_2$ is approximately 18 Amperes (A).

FIG. 4D is a plot of the current through the configurable phase 14. In an embodiment, the peak-to-peak current through the phase 14 is approximately 14 A. In this embodiment, the reason that the peak-to-peak current through the configurable phase 14 is less than the peak-to-peak current through each fixed phase $12_1$ and $12_2$ is because the inductors $L_1$ and $L_2$ are not directly coupled to each other via a common core, but are instead magnetically coupled via the inductors $L_{3a}$ and $L_{3b}$.

FIG. 4E is a plot of the sum of the currents, i.e., the total current through all three supply phases $12_1$, $12_2$, and 14. In an embodiment, the peak-to-peak amplitude of the total current is approximately 35 A.

Figure 4:
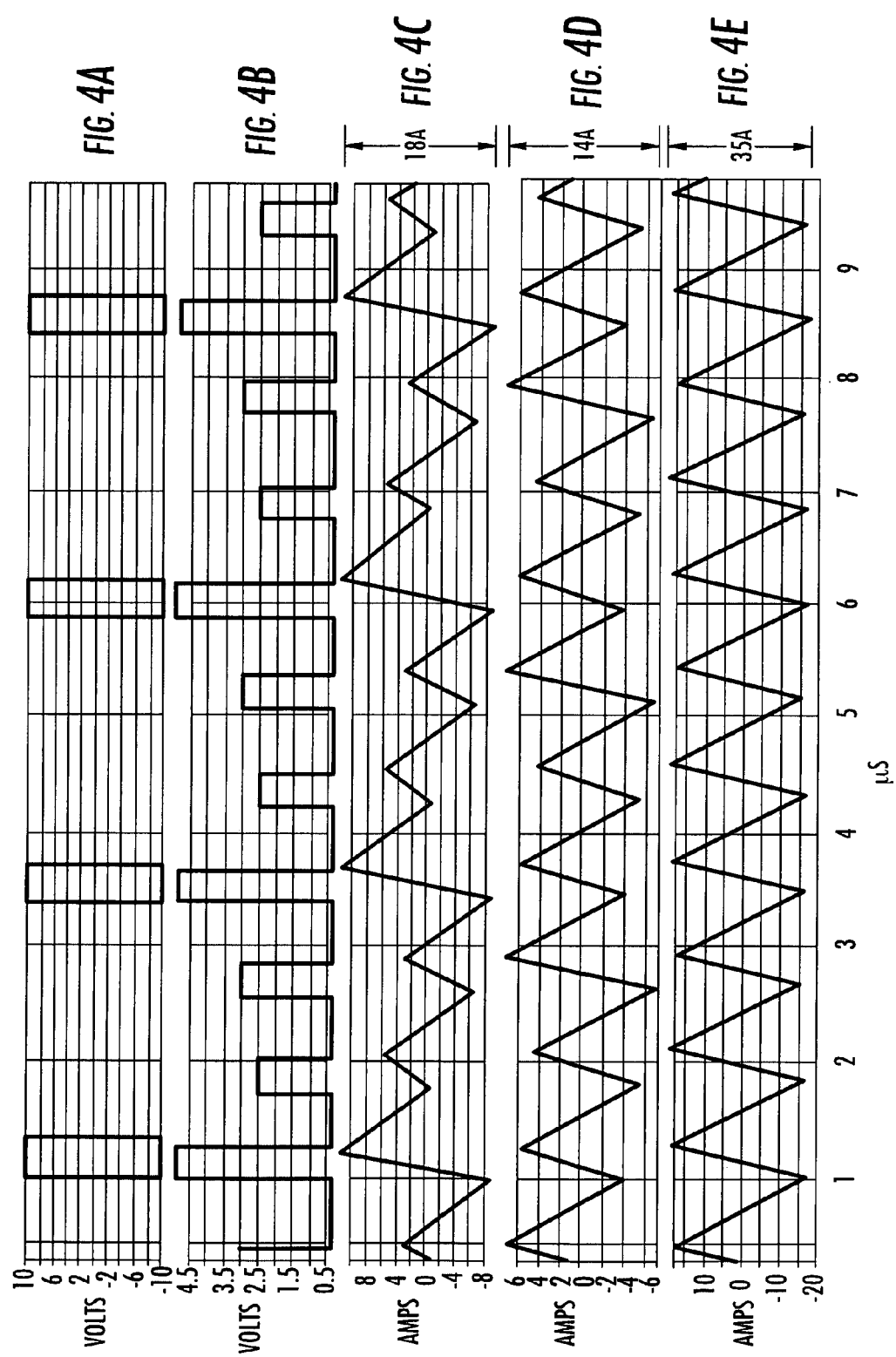
FIGS. 4A-4E are plots of signals generated by the power supply of FIG. 1 during the first operational mode under a steady-state load condition.

Referring to FIGS. 3-4E, the operation of the power supply 10 is described during an embodiment of the first operating mode under a steady-state load condition.

Generally, in the first operating mode, the power supply 10 operates substantially the same as a conventional three-phase CI power supply, and, therefore, provides substantially the same features associated with a CI power supply. With the transistors $34_1$ and $34_2$ off and on, respectively, the controller 16 (FIG. 1) drives the transistor $24_{11}$ with the voltage of FIG. 4A, and drives the transistor $24_{12}$ with a voltage inverted relative to the voltage of FIG. 4A as described above. The controller 16 drives the transistors $24_{21}$ and $32_1$ with voltages similar to the voltage driving the transistor $24_{11}$, with these voltages being phase shifted, for example by +120° and −120°, relative to the voltage driving the transistor $24_{11}$. Similarly, the controller 16 drives the transistors $24_{22}$ and $32_2$ with voltages similar to the voltage driving the transistor $24_{12}$, with these voltages being phase shifted, for example by +120° and −120°, relative to the voltage driving the transistor $24_{12}$.

Figure 5:
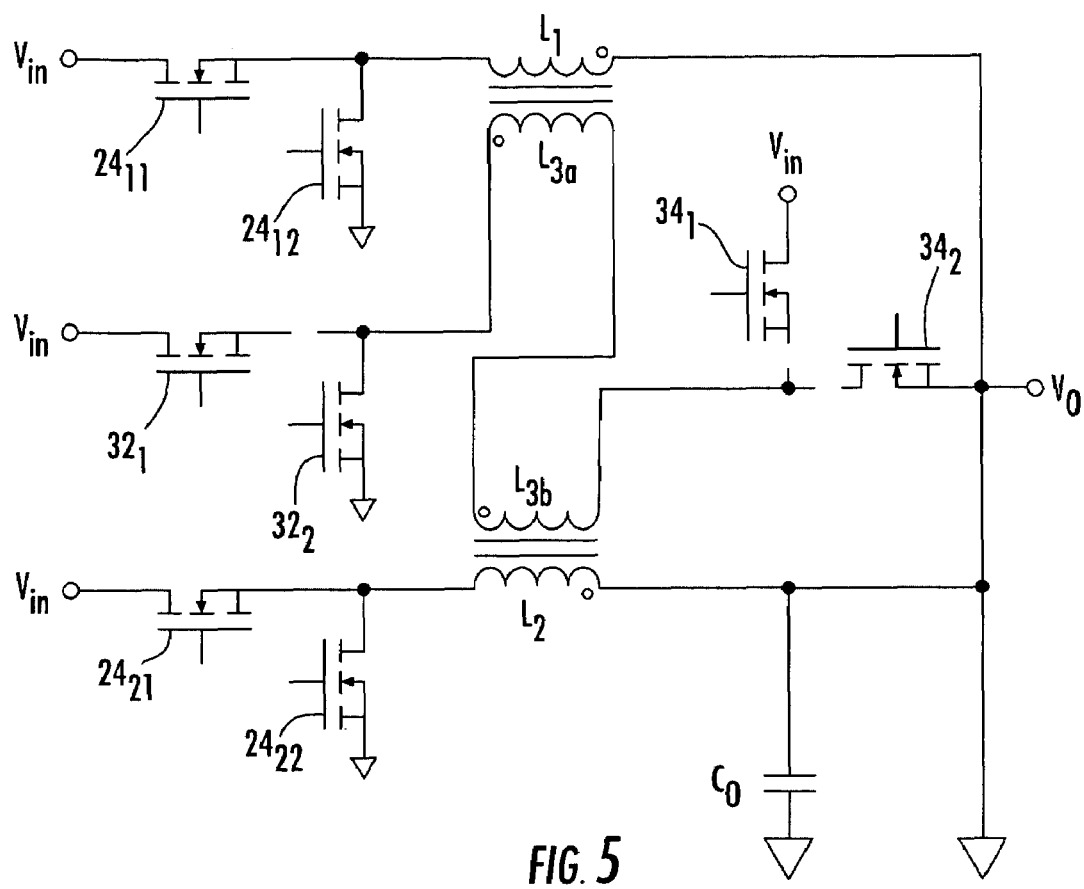
FIG. 5 is a schematic diagram of the configuration of the power supply of FIG. 1 during a second operational mode in which the supply operates as a two-phase UI supply during a steady-state load condition.

FIG. 5 is a schematic diagram that shows the configuration of the power supply 10 of FIG. 1 during an embodiment of a second operating mode in which the power supply operates as a two-phase UI supply. Like numbers reference components common to FIGS. 1 and 5, although for clarity, the controller 16 and some of the reference numbers are omitted from FIG. 5. As discussed below, one may configure the controller 16 to operate the supply 10 in the second mode under a steady-state load condition for improved efficiency as compared to the first (three-phase CI) operating mode discussed above in conjunction with FIGS. 3-4E.

In the second operating mode, the controller 16 (FIG. 1) turns all of the transistors $32_1$, $32_2$, $34_1$, and $34_2$ off, and keeps these transistors off for the duration of the second operating mode; therefore, during the second operating mode, the configurable phase 14 is effectively removed from the power supply 10. To schematically represent the off states of the transistors $32_1$, $32_2$, $34_1$, and $34_2$, the transistors $32_1$ and $32_2$ are shown disconnected from the input node of the inductor $L_{3a}$ to indicate that these transistors are electrically open and are thus off, and the transistors $34_1$ and $34_2$ are shown disconnected from the output node of the inductor $L_{3b}$ to indicate that these transistors are also electrically open and are thus off.

FIGS. 6A-6D are plots of signals generated by an embodiment of the power supply of FIG. 1 during the second operating mode under a steady-state load condition. Some of these signals may be capacitively coupled to the simulated probe, hence the excursion above and below zero.

FIG. 6A is a plot of the voltage with which the controller 16 (FIG. 1) drives the gate of the transistor $24_{11}$ and the voltage with which the controller 16 drives the transistor $24_{12}$ is the plotted voltage inverted, with an optional a guard delay as discussed above in conjunction with FIG. 4A.

FIG. 6B is a plot of the voltage with which the controller 16 (FIG. 1) drives the gate of the transistor $24_{21}$. Therefore, in this embodiment, the controller 16 drives the transistor $24_{21}$ approximately 180° out of phase relative to the transistor $24_{11}$. The voltage with which the controller 16 drives the transistor $24_{22}$ is the plotted voltage inverted, with an optional a guard delay as discussed above in conjunction with FIG. 4A. Therefore, in this embodiment, the controller 16 also drives the transistor $24_{22}$ approximately 180° out of phase relative to the transistor $24_{12}$.

FIG. 6C is a plot of the currents through the fixed phases $12_1$ and $12_2$. In an embodiment, the peak-to-peak current through each phase $12_1$ and $12_2$ is approximately 12 Amperes (A).

FIG. 6D is a plot of the total current through the phases $12_1$ and $12_2$. In an embodiment, the peak-to-peak amplitude of the total current is 11 A.

Referring to FIGS. 5-6D, the operation of the power supply 10 is described during an embodiment of the second mode.

Generally, as discussed above, in the second operating mode, the power supply 10 operates substantially the same as a conventional two-phase UI supply, and, therefore, may provide substantially the same features associated with a UI power supply. With the transistors $32_1$, $32_2$, $34_1$, and $34_2$ off, the controller 16 (FIG. 1) drives the transistor $24_{11}$ with the voltage of FIG. 6A, and drives the transistor $24_{12}$ with the inverse of this voltage as described above. Similarly, the controller 16 drives the transistor $24_{12}$ with the voltage of FIG. 6B, and drives the transistor 2422 with the inverse of this voltage as described above.

Comparing FIGS. 4E and 6D, the peak-to-peak amplitude (approximately 35 A) of the total phase current while the supply 10 is operating in the first, three-phase CI operating mode is more than triple the peak-to-peak amplitude (approximately 11 A) of the total phase current while the supply 10 is operating in the second, UI operating mode. Consequently, one may configure the controller 16 to operate the supply 10 in the second, two-phase UI mode under a steady-state load condition so that the supply operates with better efficiency than in the first operating mode.

Figure 7:
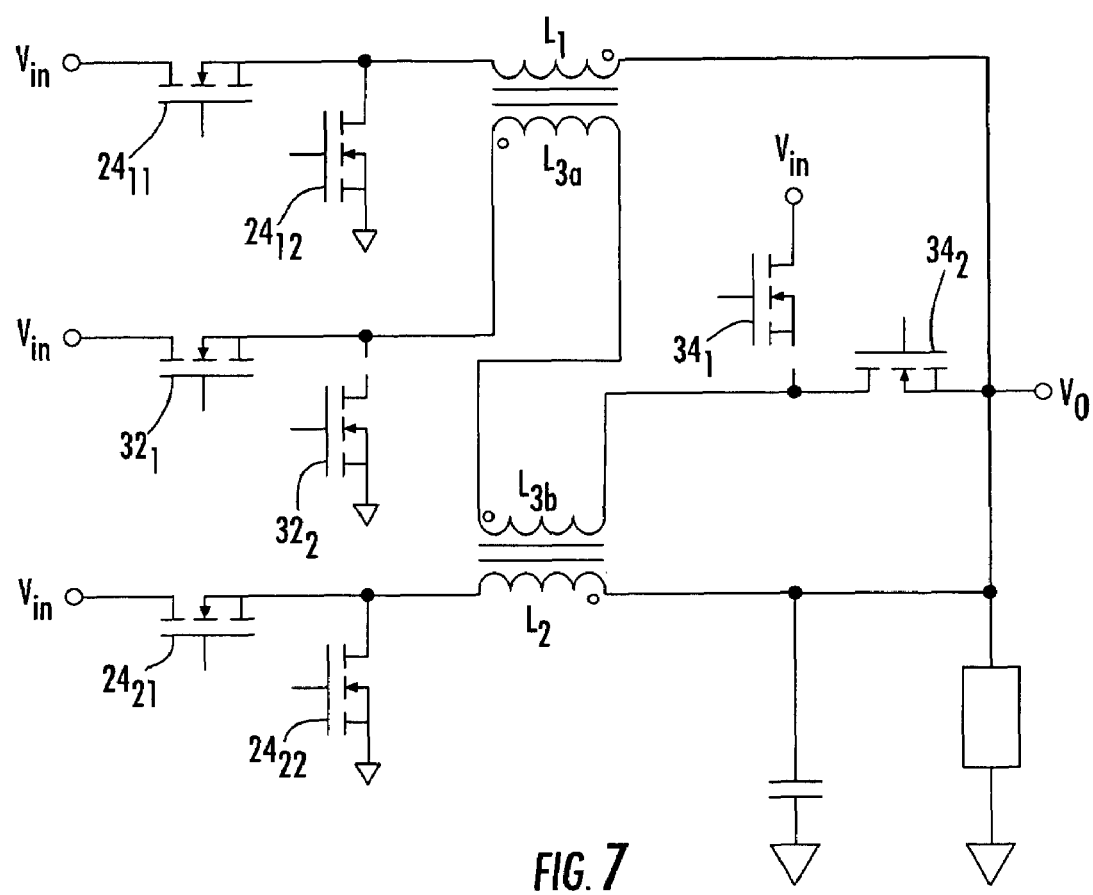
FIG. 7 is a schematic diagram of the configuration of the power supply of FIG. 1 during a third operational mode in which the supply operates as a three-phase CI supply to respond to a load-insertion transient.

FIG. 7 is a schematic diagram that shows the configuration of the power supply 10 of FIG. 1 during an embodiment of a third operating mode in which the supply operates as a three-phase CI supply. But as discussed below, the difference between the first and third modes is that in the first mode, the supply 10 is operating under a steady-state load condition, and in the third mode, the supply is responding to a load-insertion transient. Like numbers reference components common to FIGS. 1 and 7, although for clarity, the controller 16 and some of the reference numbers are omitted from FIG. 7.

In the third operating mode, the controller 16 (FIG. 1) turns the transistors $24_{11}$, $24_{21}$, $32_1$, and $34_2$ on, and turns the transistors $24_{12}$, $24_{22}$, $32_2$, and $34_1$ off for the duration of the third operating mode. Therefore, in this mode, the controller 16 couples the inductors $L_1$, $L_2$, and $L_{3a}+L_{3b}$ in electrical parallel between $V_{in}$ and $V_o$.

FIG. 8A is a plot of the load current experiencing an insertion transient.

FIG. 8B is a plot of the output voltage $V_o$ generated by the supply 10 while in response to the load insertion of FIG. 8A operating in the second UI operating mode.

FIG. 8C is a plot of the output voltage $V_o$ generated by the supply 10 in response to the load insertion of FIG. 8A while operating in the third, three-phase CI mode.

Referring to FIGS. 7-8C, the operation of the power supply 10 is described during an embodiment of the third operating mode.

Generally, as discussed above, in the third operating mode, the power supply 10 operates substantially the same as a conventional three-phase CI power supply under a load-insertion condition.

In response to detecting a load-insertion transient at time $t_1$, the controller 16 (FIG. 1) turns the transistors $24_{11}$, $24_{21}$, $32_1$, and $34_2$ on and turns the transistors $24_{12}$, $24_{22}$, $32_2$, and $34_1$ off for the duration of the third operating mode; consequently, the controller effectively couples the inductors $L_1$, $L_2$, and $L_{3a}+L_{3b}$ in electrical parallel between $V_{in}$ and $V_o$. The controller 16 may conventionally detect the load-insertion transient by detecting that the rate of decrease in the average value of $V_o$ (i.e., $V_o$ with the ripple filtered out) equals or exceeds a threshold rate.

The parallel coupling of the inductors $L_1$, $L_2$, and $L_{3a}+L_{3b}$ causes the supply 10 to deliver a transient current that meets the load's increased current consumption. Because the inductors $L_1$, $L_2$, and $L_{3a}+L_{3b}$ are magnetically coupled to one another, the effective inductance between $V_{in}$ and $V_o$ in this mode is the parallel combination of the leakage inductances of $L_1$, $L_2$, and $L_{3a}+L_{3b}$. Because these leakage inductances are typically smaller than the values that $L_1$, $L_2$, and $L_{3a}+L_{3b}$ would have if they were not magnetically coupled to one another, the supply 10 may, while operating in the third mode, better respond to a load-insertion transient than a UI supply would provide for a given output ripple voltage and filter capacitor.

Consequently, assuming that the supply 10 is operating in the second, UI mode before the load-insertion transient, in response to the load-insertion transient, the controller 16 may switch the supply from the second, UI mode to the third, CI mode.

Comparing FIGS. 8B and 8C, in an embodiment, the supply 10 operating in the third, CI mode (FIG. 8C) responds better (e.g., a smaller undershoot 42 and a faster settling time 44 for $V_o$) to a load-insertion transient than the supply operating in the second, UI mode (FIG. 8B).

After $V_o$ has stabilized, the controller 16 may exit the third mode and return to the second mode. The controller 16 may determine that $V_o$ has stabilized when the rate at which $V_o$ is decreasing is equal to or less than a rate threshold.

Figure 9:
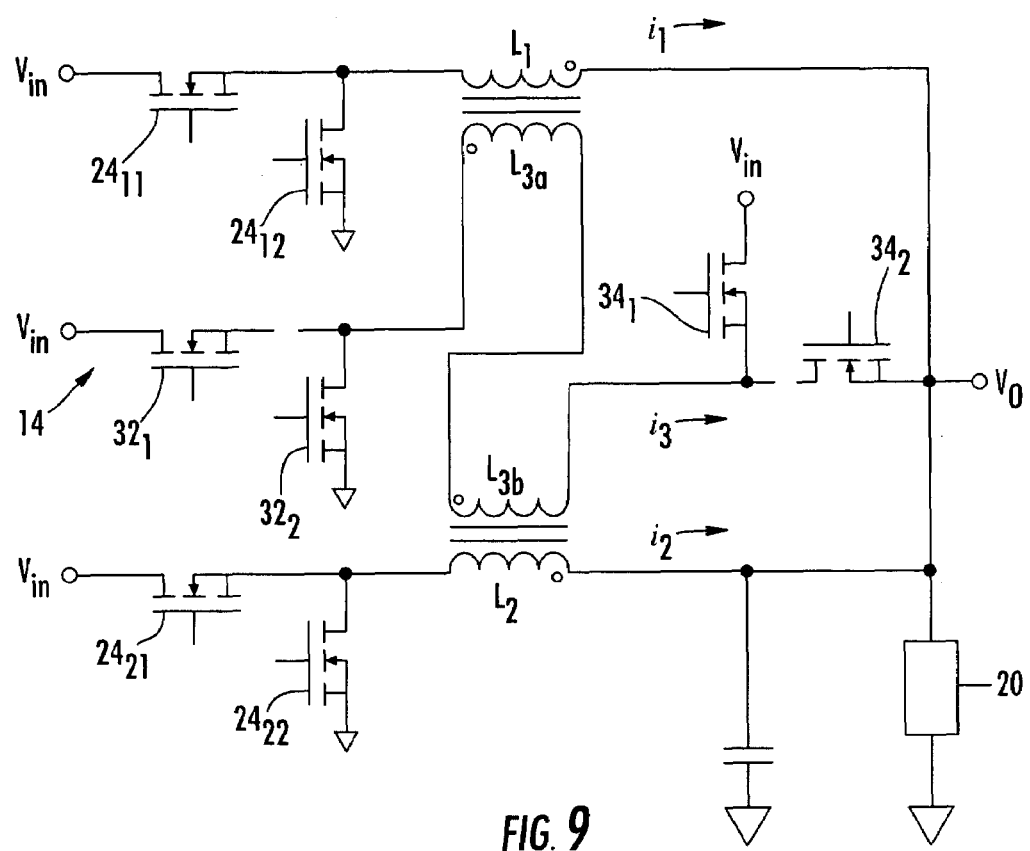
FIG. 9 is a schematic diagram of the configuration of the power supply of FIG. 1 during a fourth operational mode in which the supply is responding to a load-release transient (a step decrease in the load current).

FIG. 9 is a schematic diagram that shows the configuration of the power supply 10 of FIG. 1 during an embodiment of a fourth operating mode in which the supply responds to a load-release transient. Like numbers reference components common to FIGS. 1 and 9, although for clarity, the controller 16 and some of the reference numbers are omitted from FIG. 9.

In the fourth, energy-recapture operating mode, the controller 16 (FIG. 1) turns the transistors $24_{11}$, $24_{21}$, $32_1$, and $34_2$ off and turns the transistors $24_{12}$, $24_{22}$, $32_2$, and $34_1$ on for the duration of the fourth operating mode to recapture the energy stored in the inductors $L_1$ and $L_2$ via the inductors $L_{3a}$ and $L_{3b}$.

Figure 10A:
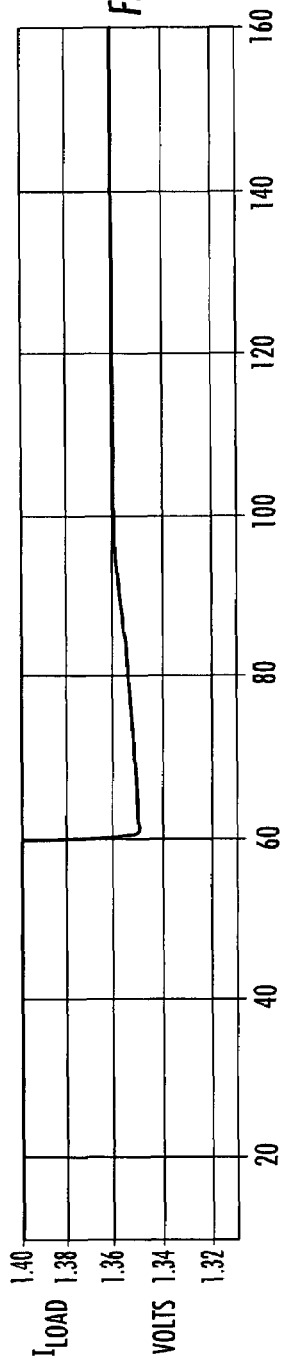
FIGS. 10A-10C are plots of the load current experiencing a load-release transient, the output-voltage-release-transient response of the power supply of FIG. 1 during the second operational mode of FIG. 5, and the output-voltage-release-transient response of the supply of FIG. 1 during the fourth operational mode of FIG. 7.

FIG. 10A is a plot of the load current experiencing a release transient.

Figure 10B:
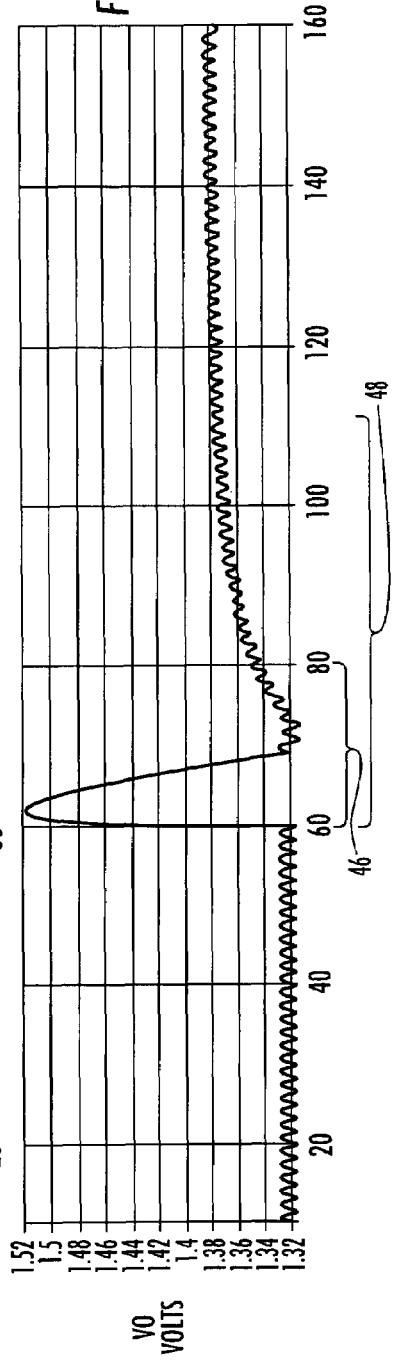

FIG. 10B is a plot of the output voltage $V_o$ generated by the supply 10 in response to the load-release of FIG. 10A while operating in the second, UI operating mode.

Figure 10C:
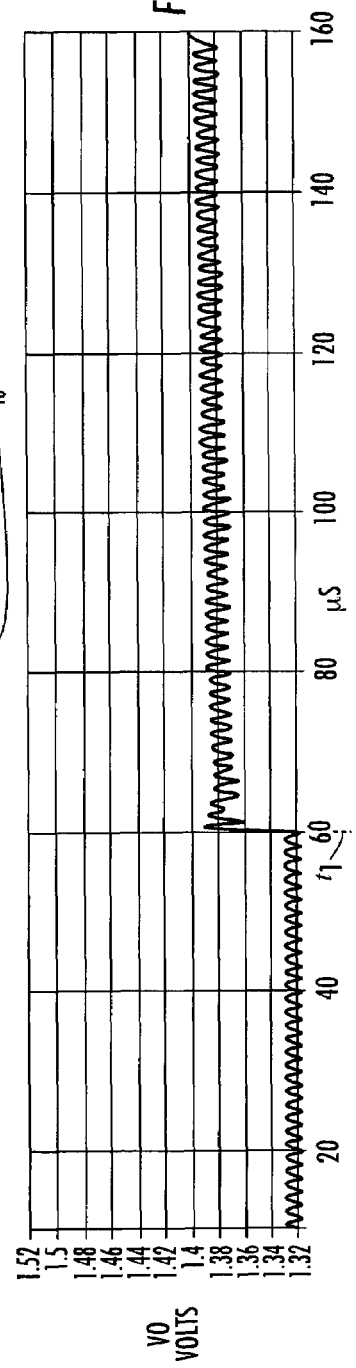

FIG. 10C is a plot of the output voltage $V_o$ generated by the supply 10 in response to the load release of FIG. 10A while operating in the fourth, energy-recapture mode.

Referring to FIGS. 9-10C, the operation of the power supply 10 is described during an embodiment of the fourth operating mode.

In response to detecting a load-release transient at time $t_1$, the controller 16 (FIG. 1) turns the transistors $24_{11}$, $24_{21}$, $32_1$, and $34_2$ off and turns the transistors $24_{12}$, $24_{22}$, $32_2$, and $34_1$ on. The controller 16 may conventionally detect the load-release transient by detecting that the rate of increase in the average value of $V_o$ (i.e., $V_o$ with the ripple filtered out) equals or exceeds a threshold rate.

Therefore, a decaying current $i_1$ flows from ground, through the transistor $24_{12}$ and the inductor $L_1$, and into the load 20.

Likewise, a decaying current $i_2$ flows from ground, through the transistor $24_{22}$ and the inductor $L_2$, and into the load 20.

Referring to FIG. 10B, if the power supply 10 is operating in the second, UI mode described above in conjunction with FIGS. 5-6D, then the currents $i_1$ and $i_2$ cause the output voltage $V_o$ to have an under-damped transient response having an oscillating portion 46 and a settling time 48. Even though the load 20 has reduced its current draw, the inductors $L_1$ and $L_2$ temporarily continue to provide the currents $i_1$ and $i_2$ at the levels needed to maintain the load's previous current draw. Because the current through an inductor cannot change instantaneously, the excess current (the portion of $i_1 + i_2$ not drawn by the load) flows into the filter capacitor 18 and causes the under-damped transient response in $V_o$. $V_o$ settles to a stable level once the currents $i_1$ and $i_2$ through $L_1$ and $L_2$ stabilize to new steady-state levels that correspond to the new load current.

But referring to FIG. 10C, if the power supply 10 is operating in the fourth, energy-recapture mode, then the excess currents through $L_1$ and $L_2$ are effectively absorbed by the power source that provides $V_{in}$, thus causing $V_o$ to have a significantly improved transient response. Because the inductors $L_1$ and $L_2$ are magnetically coupled to the inductors $L_{3a}$ and $L_{3b}$, respectively, the currents $i_1$ and $i_2$ magnetically induce in the phase 14 a current $i_3$, which flows from ground through the transistor $32_2$, the inductors $L_{3a}$ and $L_{3b}$, and the transistor $34_1$, and into the $V_{in}$ source. Ideally, the excess of the $i_1 + i_2$ currents not drawn by the load 20 is effectively converted into the current $i_3$ due to the magnetic coupling between the inductors $L_1$, $L_2$, $L_{3a}$, and $L_{3b}$ such that this excess current effectively flows back into the $V_{in}$ source instead of into the filter capacitor 18. Consequently, the energy stored in this excess current is recaptured by the $V_{in}$ source, and the $V_o$ transient response of the power supply 10 is significantly improved. Due to imperfect coupling between $L_1$, $L_2$, $L_{3a}$, and $L_{3b}$, however, the $V_{in}$ source may recapture less than all of the energy stored in the excess current.

After $V_o$ has stabilized, then the controller 16 may exit the fourth mode and return to the second, UI mode. The controller 16 may determine that $V_o$ has stabilized when the rate at which the average level of $V_o$ is increasing is equal to or less than a threshold rate.

Still referring to FIGS. 9-10C, if the load 20 is an electric motor, such as a brushless DC motor, then the controller 16 (FIG. 1) may regeneratively brake the motor by operating the power supply 10 in the above-described fourth mode or in a variation of this mode. As the motor spins while being braked, it acts as an electrical generator, and thus generates respective voltages across and respective currents through its coils. By controlling the effective load applied to these coils, the controller 16 may adjust the braking torque effectively applied to the motor. Furthermore, the controller 16 may capture the energy generated by the braking motor by effectively directing these coil currents into the power supply $V_{in}$.

Figure 11:
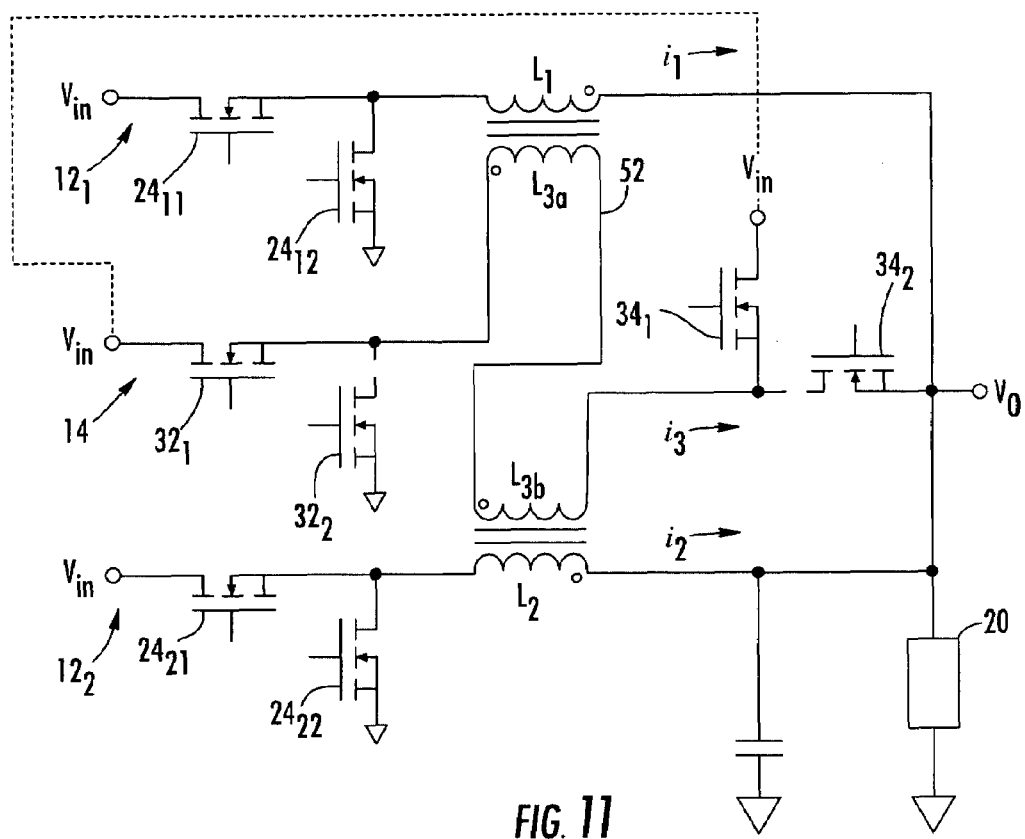
FIG. 11 is a schematic diagram of the configuration of the power supply of FIG. 1 during a fifth operational mode in which the supply operates as a two-phase CI supply.

FIG. 11 is a schematic diagram that shows the configuration of the power supply 10 of FIG. 1 during an embodiment of a fifth operating mode in which the power supply operates as a two-phase CI power supply. Like numbers reference components common to FIGS. 1 and 11, although for clarity, the controller 16 and some of the reference numbers are omitted from FIG. 11.

In the fifth operating mode, the controller 16 (FIG. 1) turns the transistors $32_1$ and $34_1$ on and turns the transistors $32_2$ and $34_2$ off.

Consequently, the input node of the inductor $L_{3a}$ is coupled to the output node of the inductor $L_{3b}$ to form a closed loop 52 that includes the inductors $L_{3a}$ and $L_{3b}$ in electrical series.

The closed loop 52 magnetically couples the inductor $L_1$ to the inductor $L_2$, and thus magnetically couples together the two phases $12_1$ and $12_2$. When a current $i_1$ flows through the phase $12_1$, $i_1$ induces in the loop 52 a current $i_3$, which induces a current $i_2$ in the phase $12_2$. Similarly, when a current $i_2$ flows through the phase $12_1$, $i_2$ induces in the loop 52 the current $i_3$, which induces the current $i_1$ in the phase $12_1$.

Therefore, in the fifth operating mode, the controller 16 uses the adjustable phase 14 to magnetically couple together the phases $12_1$ and $12_2$ such that the controller may operate the supply 10 as a two-phase CI supply.

Figure 12:
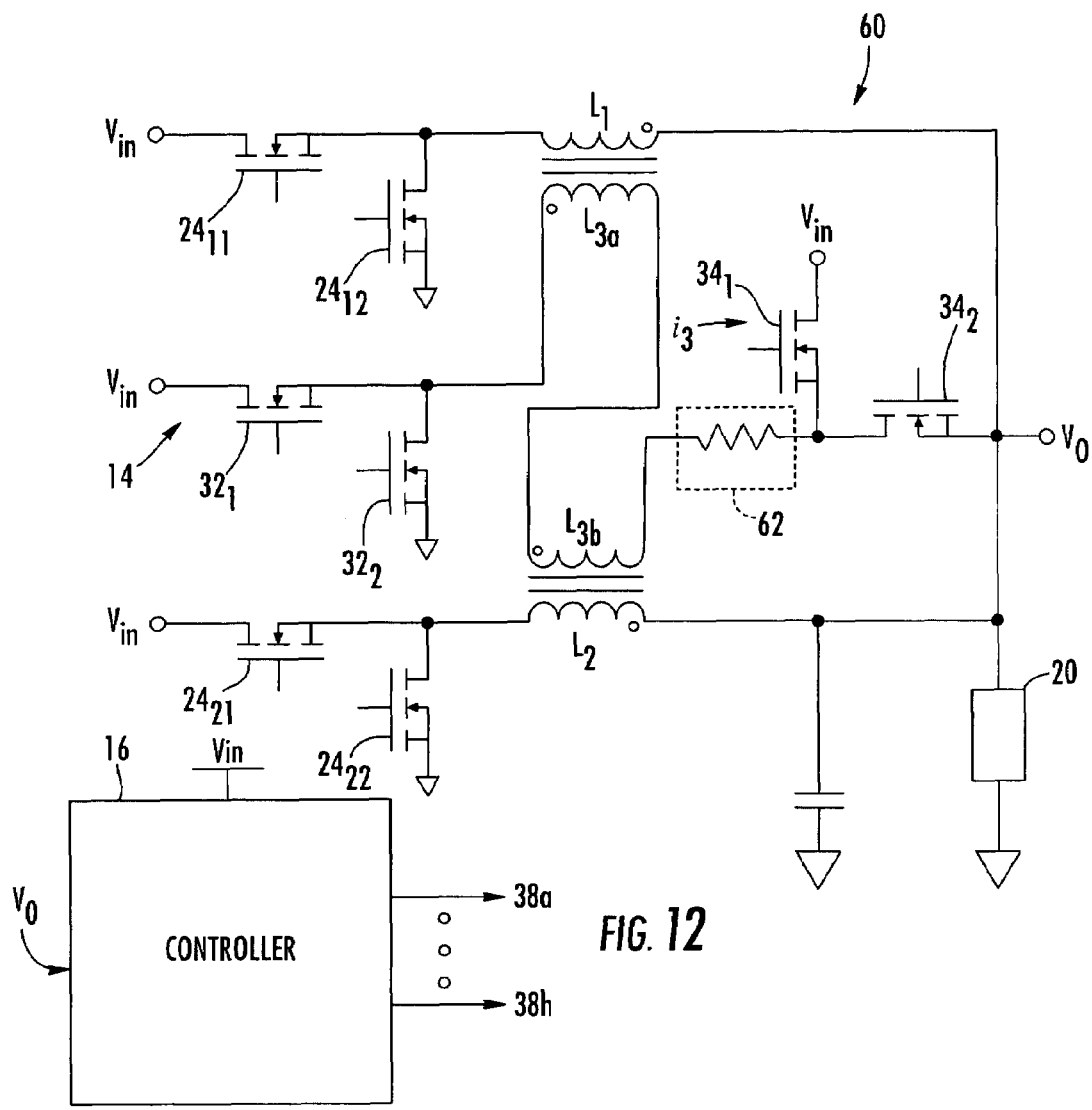
FIG. 12 is a schematic diagram of an embodiment of a power supply that is similar to the power supply of FIG. 1 but that includes a sensor for indicating the current flowing through the configurable supply phase.

FIG. 12 is a schematic diagram of an embodiment of a power supply 60, which is similar to the power supply 10 of FIG. 1, but which includes a sense circuit 62 (a resistor in this embodiment) that allows the controller 16 to determine the level and direction of a current $i_3$ flowing in the phase 14. Like numbers reference components common to FIGS. 1 and 12, although for clarity, some of the reference numbers are omitted from FIG. 12. Furthermore, although shown as a resistor, the circuit 62 may include another element, or may include multiple elements. Moreover, the circuit 62 may be in electrical parallel with one or both of the inductors $L_{3a}$ and $L_{3b}$ instead of in series with these inductors.

FIG. 13A is a plot of the load current experiencing a load-release transient followed by a load-insertion transient.

FIG. 13B is a plot of the output voltage $V_o$ generated by the supply 60 in response to the load current of FIG. 13A while the supply is operating in the second, UI mode.

FIG. 13C is a plot of the output voltage $V_o$ generated by the supply 60 in response to the load current of FIG. 13A while the supply sequences through the second, fourth, fifth, second, third, and second operating modes.

Referring to FIGS. 12-13B, while operating in the second, UI mode, the supply 60 has a relatively poor $V_o$ transient response to the load current of FIG. 13A. At time $t_1$, the supply 60 causes an overshoot 62 in $V_o$ in response to the load-release transient as discussed above in conjunction with FIGS. 9 and 10B. And at time $t_2$, the supply 60 causes an undershoot 64 in $V_o$ in response to the load-insertion transient as discussed above in conjunction with FIGS. 7 and 8B.

Comparatively, referring to FIGS. 12-13A and 13C, while sequencing through the second, fourth, fifth, second, third, and second operating modes, the supply 60 has an improved $V_o$ transient response to the load current of FIG. 13A.

Before time $t_1$, the controller 16 operates the supply 60 in the second, UI mode as discussed above in conjunction with FIGS. 5-6D.

At time $t_1$, in response to detecting the load release, the controller 16 operates the supply 60 in the fourth, energy-recapture mode as described above in conjunction with FIGS. 9-10A and 10C to reduce the $V_o$ overshoot as compared to the overshoot 62 of FIG. 12B.

Next, after time $t_1$ and in response to detecting that the rate of increase in the average level of $V_o$ is equal to or less than a threshold rate, the controller 16 transitions the supply 60 to the fifth, two-phase CI mode as discussed above in conjunction with FIG. 11. This allows any current $i_3$ that remains flowing through the phase 14 from the fourth, energy-recapture mode to decay naturally and release its energy into the phases $12_1$ and $12_2$ via magnetic coupling.

Then, when the controller 16 senses via the circuit 62 that the current $i_3$ in the phase 14 is equal to or below a threshold current, the controller transitions the supply 16 back to the second, UI mode.

Next, at time $t_2$, in response to detecting the load insertion, the controller 16 operates the supply 60 in the third, three-phase CI mode described above in conjunction with FIGS. 7-8A and 8C to reduce the $V_o$ undershoot as compared to the undershoot 64 of FIG. 13B.

Then, after time $t_2$ and in response to detecting that the rate of decrease in the average level of $V_o$ is equal to or less than a threshold rate, the controller 16 transitions the supply 60 to the fifth, two-phase CI mode. This allows any current $i_3$ that remains flowing through the phase 14 from the third, three-phase CI mode to decay naturally and release its energy into the phases $12_1$ and $12_2$ via magnetic coupling.

Next, when the controller 16 senses via the circuit 62 that the current $i_3$ in the phase 14 is equal to or below a threshold current, the controller transitions the supply 60 back to the second, UI mode.

The controller 16 maintains the supply 60 in the second, UI mode until another load release or load insertion occurs.

Still referring to FIGS. 12-13A and 13C, other embodiments of the above mode sequences are contemplated. For example, if the period between $t_1$ and $t_2$ is so small that the current $i_3$ through the phase 14 never equals or falls below the threshold current, then the controller 16 may transition the supply 60 from the fifth, two-phase-CI mode directly into the third, three-phase CI mode without first transitioning the supply into the second, UI operating mode. Furthermore, if the period between $t_1$ and $t_2$ is even smaller, then the controller 16 may transition the supply 60 directly from the fourth, energy-recapture mode to the third, three-phase CI mode without first transitioning the supply into the second, UI and fifth, two-phase-CI modes.

Figure 14:
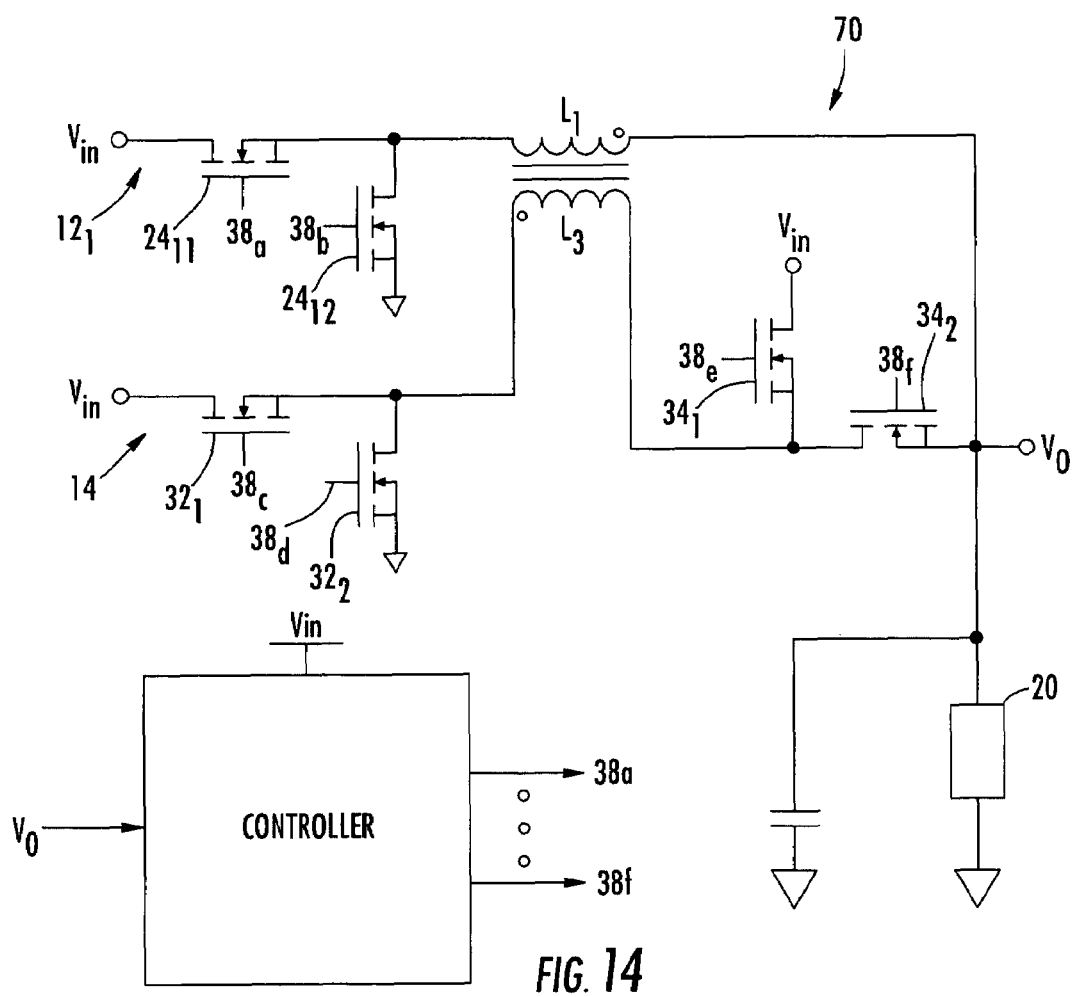
FIG. 14 is a schematic diagram of an embodiment of a power supply that is similar to the power supply of FIG. 1 but that includes only one non-configurable supply phase.

FIG. 14 is a schematic diagram of an embodiment of a power supply 70, where like numbers reference components common to FIGS. 1 and 14. The supply 70 is similar to the supply 10 of FIG. 1, except that the phase $12_2$ is omitted from the supply 70. Furthermore, the supply 70 may include in the phase 14 a sense circuit similar to the sense circuit 62 discussed above in conjunction with FIG. 12.

When the transistors $32_1$, $32_2$, $34_1$, and $34_2$ are off, then the controller 16 may operate the supply 70 in a single-phase UI mode. When the transistor $34_1$ is off and the transistor $34_2$ is on, then the controller 16 may operate the supply 70 in a two-phase CI mode. When the transistors $24_{11}$, $32_1$, and $34_2$ are on and the transistor $34_1$ is off, then the controller 16 may operate the supply 70 in a two-phase CI mode in response to a load-insertion transient. When the transistors $32_1$ and $34_1$ are on and the transistors $32_2$ and $34_2$ are off, then the controller 16 may operate the supply 70 in a mode in which energy stored in the phase 14 is released into the phase 12, via magnetic coupling between $L_1$ and $L_3$. And when the transistors $32_1$ and $34_2$ are off and the transistors $32_2$ and $34_1$ are on, then the controller 16 may operate the supply 70 in an energy-recapture mode in response to a load-release transient.

Figure 15:
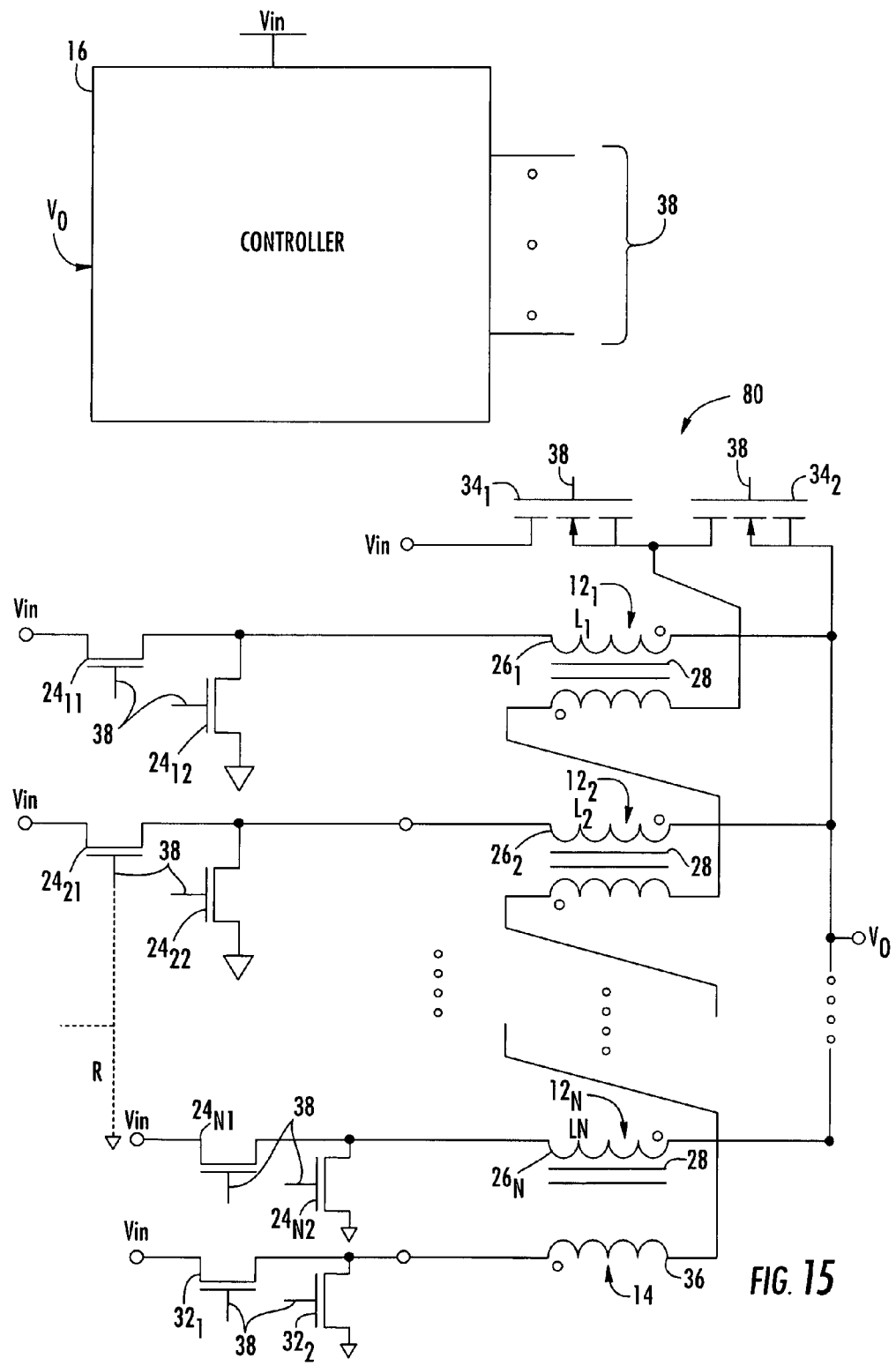
FIG. 15 is a schematic diagram of an embodiment of a power supply that is similar to the power supply of FIG. 1 but that includes more than two non-configurable supply phases.

FIG. 15 is a schematic diagram of an embodiment of a power supply 80, where like numbers reference components common to FIGS. 1 and 15. The supply 80 is similar to the supply 10 of FIG. 1, except that the supply 80 includes N phases $12_1$-$12_N$ instead of only two phases $12_1$ and $12_2$. Furthermore, the supply 80 may include in the phase 14 a sense circuit similar to the sense circuit 62 discussed above in conjunction with FIG. 12.

When the transistors $32_1$, $32_2$, $34_1$, and $34_2$ are off, then the controller 16 may operate the supply 80 in an N-phase UI mode. When the transistor $34_1$ is off and the transistor $34_2$ is on, then the controller 16 may operate the supply 80 in an (N+1)-phase CI mode. When the transistors $24_{11}$-$24_{N1}$, $32_1$, and $34_2$ are on and the transistor $34_1$ is off, then the controller 16 may operate the supply 80 in an (N+1)-phase CI mode in response to a load-insertion transient. When the transistors $32_1$ and $34_1$ are on and the transistors $32_2$ and $34_2$ are off, then the controller 16 may operate the supply 80 in an N-phase CI mode. And when the transistors $32_1$ and $34_2$ are off and the transistors $32_2$ and $34_1$ are on, then the controller 16 may operate the supply 80 in an energy-recapture mode in response to a load-release transient.

Figure 16:
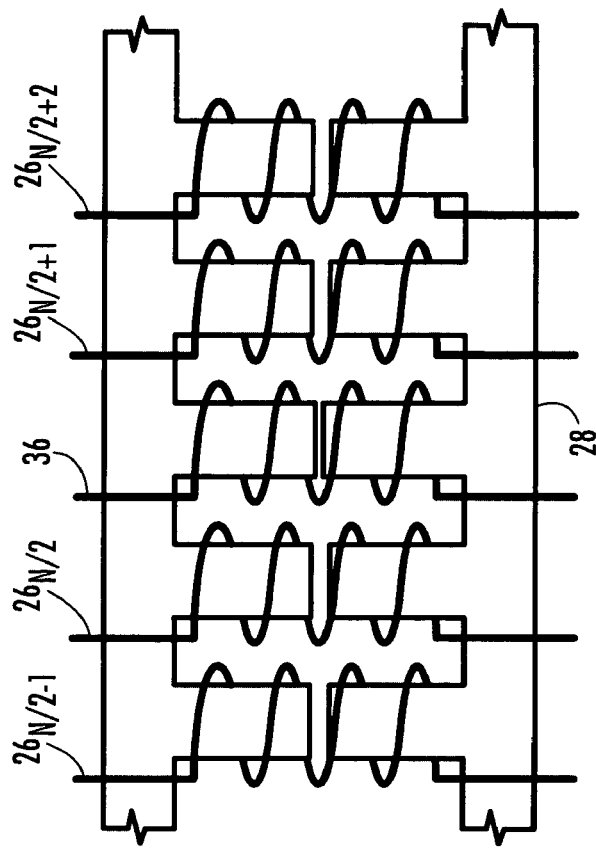
FIG. 16 is a diagram of an embodiment of the magnetic core and the phase windings for the power supply of FIG. 15.

FIG. 16 is a diagram of an embodiment of the windings $26_1$-$26_N$, the core $28_1$ and the winding 36 of FIG. 15. The core 28 may be made from any suitable magnetically permeable material, and although shown as including an air gap in each rung, the core may omit the air gap in one or more of the rungs. Furthermore, although the gap width in the rung around which the winding 36 is wrapped is smaller than the other gap widths, the air gaps may have any suitable widths shown as each having the same width, the gaps may have different widths. Moreover, variations of the core 28 may be used with the supplies 10 (N=2), 60 (N=2), and 70 (N=1) of FIGS. 1, 12, and 14, respectively. Alternatively, the core 28 may be made from a suitable non-magnetically permeable material. Or, the transformer formed by the windings $26_1$-$26_N$ may be coreless. For example, the windings $26_1$-$26_N$ may be effectively wrapped around an air core or the equivalent thereof.

Figure 17:
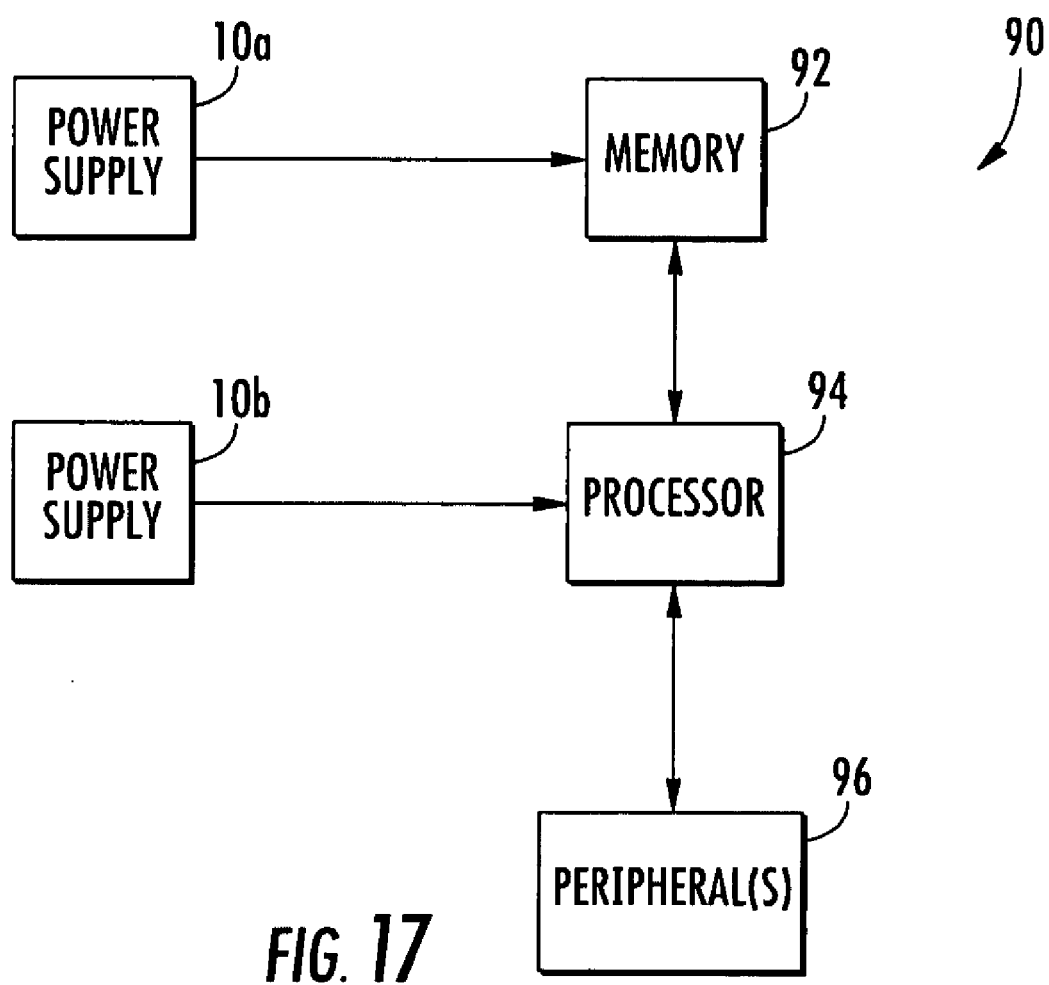
FIG. 17 is a schematic diagram of an embodiment of a system that incorporates one or more of the power supplies of FIGS. 1, 12, 14, and 15.

FIG. 17 is a schematic diagram of an embodiment of a computer system 90, which may include one or more of the power supplies 10 (FIG. 1), 60 (FIG. 12), 70 (FIG. 14), and 80 (FIG. 15). For example purposes, the computer system 90 is described as including two power supplies $10_a$ and $10_b$ that are similar to the supply 10 of FIG. 1.

In addition to the supplies $10_a$ and $10_b$, the system 90 includes a memory 92, a processor 94, and one or more peripherals 96. Examples of the peripherals 96 include, e.g., a disk drive, key board, mouse, display, video card, and printer.

The supply $10_a$ provides a supply voltage $V_{oa}$ to the memory 92, and the supply $10_b$ provides a supply voltage $V_{ob}$ to the processor 94. Example levels of $V_{oa}$ and $V_{ob}$ include 1.8V and 3.3V.

From the foregoing it will be appreciated that, although specific embodiments have been described herein for purposes of illustration, various modifications may be made without deviating from the spirit and scope of the invention. Furthermore, where an alternative is disclosed for a particular embodiment, this alternative may also apply to other embodiments even if not specifically stated.

What is claimed is:

1. A power-supply controller operable:
   to couple a first node of a first inductor to first and second reference nodes, the first inductor composing a first phase of a power supply and having a second node coupled to an output node of the power supply;
   to couple a first node of a second inductor to third and fourth reference nodes, the second inductor composing a second phase of the power supply and having a second node; and to uncouple the second node of the second inductor from the output node of the power supply.

2. The power-supply controller of claim 1, further operable to couple the second node of the second inductor to one of the third and fourth reference nodes while the second node of the second inductor is uncoupled from the output node of the power supply.

3. The power-supply controller of claim 1, further operable to couple the second node of the second inductor to one of the third and fourth reference nodes and to couple the first node of the second inductor to the other of the third and fourth reference nodes while the second node of the second inductor is uncoupled from the output node of the power supply.

4. The power-supply controller of claim 1, further operable to couple the first and second nodes of the second inductor to one of the third and fourth reference nodes while the second node of the second inductor is uncoupled from the output node of the power supply.

5. The power-supply controller of claim 1, further operable to couple the second node of the second inductor to the output node of the power supply.

6. The power-supply controller of claim 1 wherein:
the first and third reference nodes comprise a same node; and
the second and fourth reference nodes comprise a same node.

7. The power-supply controller of claim 1, further operable to couple a first node of a third inductor to fifth and sixth reference nodes, the third inductor composing a third phase of the power supply and having a second node coupled to the output node of the power supply.

8. A power supply, comprising:
first, second, third, and fourth input nodes;
an output node operable to carry a regulated voltage;
a first phase including
 a first inductor having a first node and having a second node coupled to the output node, and
 a first switching circuit operable to couple the first node of the first inductor to the first and second input nodes; and
a second phase including
 a second inductor having first and second nodes, and
 a second switching circuit operable to couple the first node of the second inductor to the third and fourth input nodes and operable to couple and uncouple the second node of the second inductor from the output node.

9. The power supply of claim 8 wherein the second switching circuit is further operable to couple the second inductor node of the second inductor to one of the third and fourth input nodes while uncoupling the second inductor node of the second inductor from the output node.

10. The power supply of claim 8 wherein the second switching circuit is further operable to couple the second inductor node of the second inductor to one of the third and fourth input nodes and to couple the first inductor node of the second inductor to the other of the third and fourth input nodes while uncoupling the second inductor node of the second inductor from the output node.

11. The power supply of claim 8 wherein the second switching circuit is further operable to couple the first and second nodes of the second inductor to one of the third and fourth input nodes while uncoupling the second node of the second inductor from the output node.

12. The power supply of claim 8 wherein the first switching circuit comprises:
a first switch coupled between the first input node and the first node of the first inductor; and
a second switch coupled between the second input node and the first node of the first inductor.

13. The power supply of claim 8 wherein the second switching circuit comprises:
a first switch coupled between the third input node and the first node of the second inductor;
a second switch coupled between the fourth input node and the first node of the second inductor;
a third switch coupled between the third input node and the second node of the second inductor; and
a fourth switch coupled between the output node and the second node of the first inductor.

14. The power supply of claim 8, further comprising:
a core;
wherein the first inductor comprises a first winding that is wound about the core; and
wherein the second inductor comprises a second winding that is wound about the core.

15. The power supply of claim 8, further comprising:
a core;
wherein the first inductor comprises a first winding that is wound about the core; and
wherein the second inductor comprises a second winding that is wound about the core in an orientation relative to the first winding such that a first current flowing from the first to the second node of the first inductor induces in the second inductor a second current flowing form the first to the second node of the second inductor.

16. The power supply of claim 8, further comprising:
fifth and sixth input nodes; and
a third phase including
 a third inductor having a first node and having a second node coupled to the output node, and
 a third switching circuit operable to couple the first node of the third inductor to the fifth and sixth input nodes.

17. The power supply of claim 16 wherein the third switching circuit comprises:
a first switch coupled between the fifth input node and the first node of the third inductor; and
a second switch coupled between the sixth input node and the first node of the third inductor.

18. The power supply of claim 16, further comprising:
a core;
wherein the first inductor comprises a first winding that is wound about the core;
wherein the second inductor comprises a second winding that is wound about the core; and
wherein the third inductor comprises a third winding that is wound about the core.

19. The power supply of claim 16, further comprising:
a core;
wherein the first inductor comprises a first winding that is wound about the core;
wherein the second inductor comprises a second winding that is wound about the core;
wherein the third inductor comprises a third winding that is would about the core; and
wherein the first, second, and third windings are oriented relative to one another such that a first current flowing from the first to the second node of any of the inductors induces in each of the other inductors a second current flowing form the first to the second node of the other inductor.

20. The power supply of claim 8, further comprising a controller operable to control the first and second switching circuits.

21. A system, comprising:
a power supply, including
first, second, third, and fourth input nodes;
an output node operable to carry a regulated voltage;
a first phase including
a first winding having a first node and having a second node coupled to the output node, and
a first switching circuit operable to couple the first node of the first winding to the first and second input nodes; and
a second phase including
a second winding having first and second nodes, and
a second switching circuit operable to couple the first node of the second winding to the third and fourth input nodes and operable to couple and uncouple the second node of the second winding from the output node, and
a controller operable to control the first and second switching circuits; and
a first integrated circuit having a supply node coupled to the output node of the power supply.

22. The system of claim 21 wherein the power supply is disposed on a second integrated circuit.

23. The system of claim 21 wherein the controller is disposed on the first integrated circuit.

24. The system of claim 21 wherein the controller is disposed on a second integrated circuit.

25. The system of claim 21 wherein the power supply further includes:
a core; and
wherein the first and second windings are wound about the core.

* * * * *

UNITED STATES PATENT AND TRADEMARK OFFICE
CERTIFICATE OF CORRECTION

| | | |
|---|---|---|
| PATENT NO. | : 7,667,440 B2 | Page 1 of 1 |
| APPLICATION NO. | : 12/006726 | |
| DATED | : February 23, 2010 | |
| INVENTOR(S) | : Weihong Qiu et al. | |

It is certified that error appears in the above-identified patent and that said Letters Patent is hereby corrected as shown below:

- In Claim 15, Column 14, Line 29 of the patent, please change the text "flowing form" to -- flowing from --.

- In Claim 19, Column 14, Line 61 of the patent, please change the text "would about the core" to -- wound about the core --.

- In Claim 19, Column 14, Line 66 of the patent, please change the text "flowing form" to -- flowing from --.

Signed and Sealed this
Eighth Day of March, 2011

David J. Kappos
*Director of the United States Patent and Trademark Office*